April 20, 1926.  1,581,134
H. E. MERSELES
WASHING MACHINE
Filed June 15, 1921  6 Sheets-Sheet 1

Witness:
John Enders

Inventor
H. E. Merseles,
By Wallace R. Lane
Atty.

April 20, 1926.

H. E. MERSELES

WASHING MACHINE

Filed June 15, 1921    6 Sheets-Sheet 2

April 20, 1926.  
H. E. MERSELES  
WASHING MACHINE  
Filed June 15, 1921

H. E. MERSELES

WASHING MACHINE

Filed June 15, 1921     6 Sheets-Sheet 4

Witness:
John Enders

Inventor:
H. E. Merseles,
by Wallace R. Lane
Atty.

Patented Apr. 20, 1926.

1,581,134

UNITED STATES PATENT OFFICE.

HERBERT E. MERSELES, OF BRONXVILLE, NEW YORK.

WASHING MACHINE.

Application filed June 15, 1921. Serial No. 477,711.

*To all whom it may concern:*

Be it known that I, HERBERT E. MERSELES, a citizen of the United States, residing at Bronxville, New York, have invented new and useful Improvements in a Washing Machine, of which the following is a specification.

The present invention relates to the washing, rinsing and sterilizing mechanism, and more particularly to automatic means for preventing the operation of the washing and rinsing, or sterilizing, mechanism simultaneously, but includes also certain other features.

Among the objects of my invention are to improve upon the washing, rinsing and sterlizing mechanism of a machine of the character described, to improve upon the arrangement of the parts of such a machine, to reduce to a minimum the breakage of dishes in such a machine, to render the machine more sturdy and durable, and such further objects advantages and capabilities as will later more fully appear.

My invention further resides in the combination, construction and arrangement of parts illustrated in the accompanying drawings, and while I have shown therein a preferred embodiment I desire the same to be understood as illustrative only and not as limiting my invention.

In the drawings annexed hereto and forming a part hereof, a preferred embodiment and some modifications of my invention are shown. In these drawings Figs. 11 to 15 show another modification of my construction, Fig. 11 being a plan view of the machine showing the parts in "off" position. Fig. 12 shows the relationship of certain of the parts in position shown in Fig. 11, while

Referring more in detail to the drawings, 1 designates the top of the machine; 2 the washing, rinsing and sterilizing chamber, 3 the dish-holding rack, 4 the washing heads adapted to spray water upon the dishes for the washing thereof, and 5 the system of pipes carrying water to the washer heads from a reservoir T located below the chamber 2 to catch the water which has passed over the dishes for re-use. Flow of water through the pipe system 5 is caused by a power-driven centrifugal pump P inserted therein. While the particular form of apparatus used for distributing the wash water over the dishes is not material to the present invention, it may be noted that the washer heads 4 shown in the drawings are of the rotary wash arm type, and that each consists of a rotatably mounted hub $4^a$ provided with radial arms $4^b$ having nozzles $4^c$, some or all of which may be inclined so as to cause a rotation of the washer heads through the re-action of the water discharged from the nozzles.

A pair of pipes R, S, each carrying a suitable valve, is connected by a T, or in any other suitable manner, to a pipe 6 in which is located a suitable cutoff 7 here shown as a valve having a spring pressed plunger 8, to close the opening from the pipe 6 to a suitable system of piping 9 leading to the rinse distributor 10, which in the form shown consists of two upper spray nozzles $10^a$ and two lower spray nozzles $10^b$, all located in the chamber 2 and directed toward the dish holding rack 3. It will be noted that the arrangement which has been described permits the rinsing or sterilizing of dishes on the rack 3, by means of rinsing or sterilizing fluids supplied through the pipes R and S from sources outside the machine. Furthermore, the piping and nozzles through which the rinsing or sterilizing fluid is supplied to the dishes is entirely distinct from the piping and sprayer heads through which the wash water passes, so that the rinsing and sterilizing fluids cannot be in any way contaminated by the wash water which necessarily becomes soiled on account of its reuse.

In order that the full benefits of the arrangement shown may be obtained, it is necessary that the dishes be first washed and then rinsed or sterilized, and accordingly that the supply of washing water to the washing heads 4 and the supply of rinsing or sterilizing fluid to the distributor 10 be successive and not simultaneous. Means for securing the successive operation of the washing and rinsing apparatus will next be described.

At the top of the washing machine is a pair of brackets 11 and 12 suitably secured in place. Mounted in these brackets is a rod 13 carrying a pair of cams 14 and 15. Pivoted on bracket 11 is a lever 16 which is actuated in one direction by the cam 14 upon the rotation of shaft 13. When this lever is actuated by the cam it engages a push rod 17 which carries the valve closure member 8.

A link 18 is provided with a slot 19 through which passes the rod 13 adapted to guide link 18 in its reciprocative motion, caused by the cam 15 engaging a roller bearing 20 pivoted on a pin 21 secured to the link. The link is actuated in one direction by a resilient member 22, here shown as a coiled spring, which is attached in a suitable manner to the link, as shown at 23. The link 18 is suitably secured to a crank arm 24, which is secured to, or forms a part of, the operating member 25 (Figure 3), by means of which the valve 26 in the water supply pipe 5 is actuated.

Figure 1:
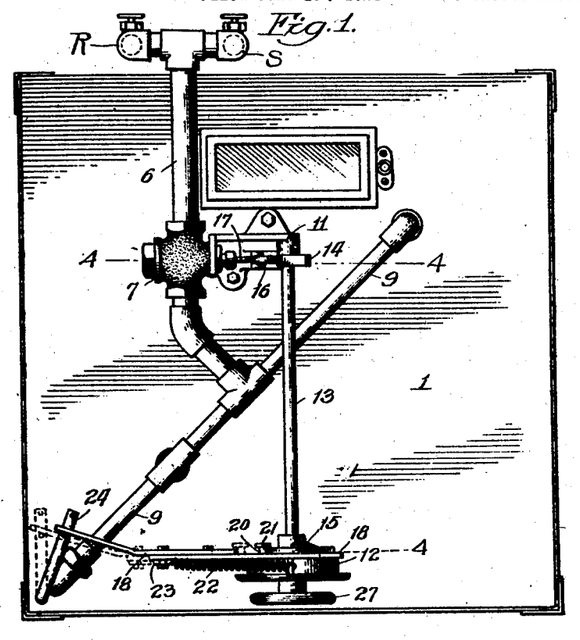
Figure 1 shows a plan view of the machine.
Figure 2:
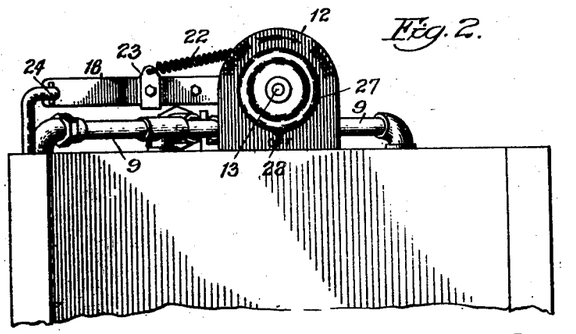
Figure 2 is a fragmentary elevation of the top portion of the machine.
Figure 3:
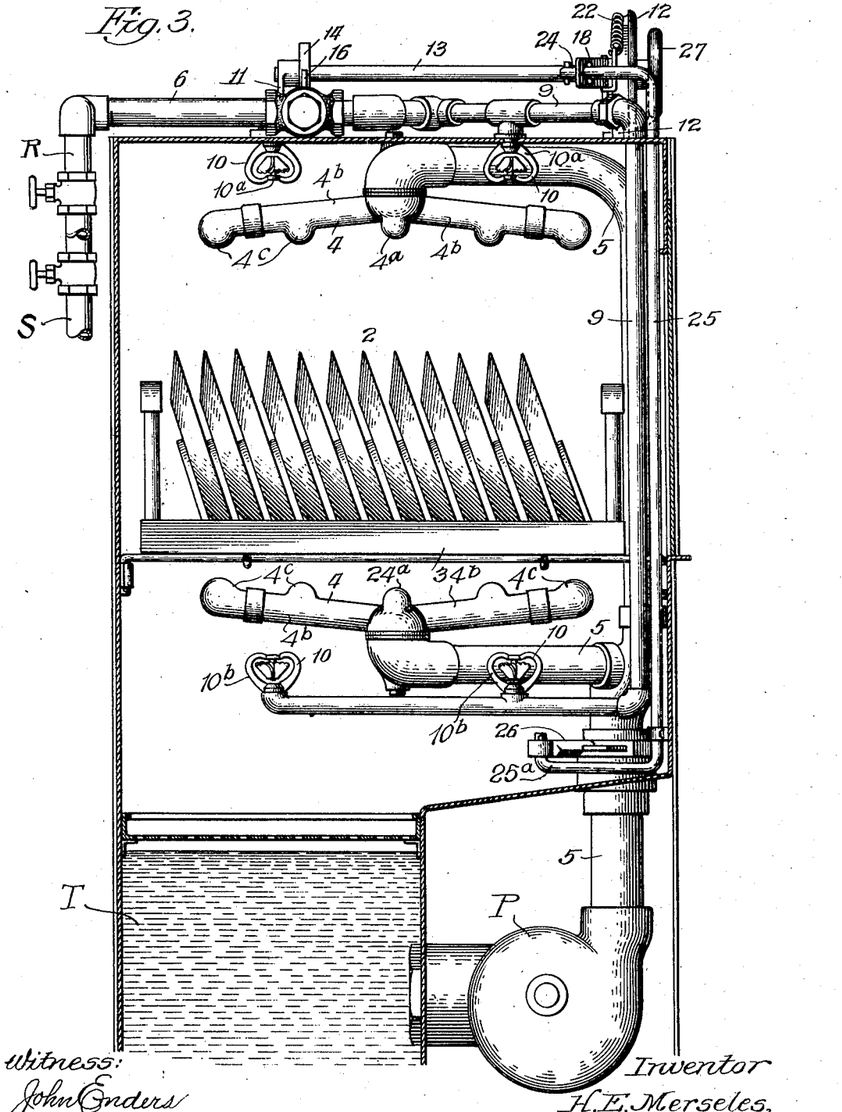
Figure 3 is a partial vertical section thereof.

As shown in Figure 3, the operating member 25 is a vertical rod or shaft having at its upper end the crank arm 24 to which the link 18 is secured and at its lower end a crank arm 25ª connected to the valve 26. This valve has the form of a gate sliding in a slot provided in the pipe 5. In the position of the operating member which is shown in full lines in Figure 1 and in Figure 3, the valve 26 is closed, that is to say, it cuts off flow through the pipe 5. When the operating member 25 and its crank arms 24 and 25ª are turned in anti-clockwise direction (looking from the top) from the position shown in full lines in Figures 1 and 3, the valve is placed in its "open" position, that is, it is partially withdrawn from the pipe 5 through its slot to permit free flow of water through the pipe.

Rod 13 is provided with a handle 27 which has an indicating pointer 28 adapted to cooperate with indications on one face of the bracket 12. These indications tell whether all the water is cut off, or whether the valves are set to wash or rinse the dishes.

Figure 4:
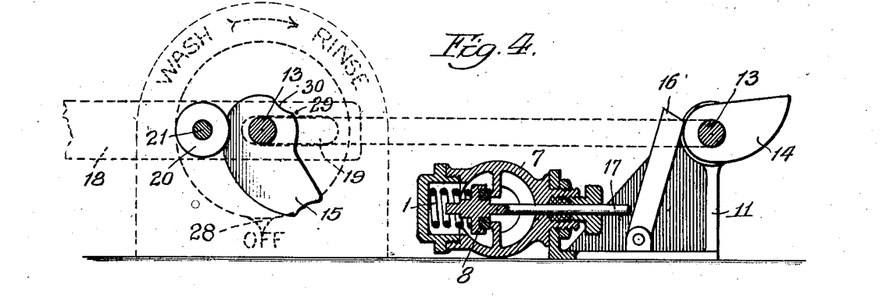
Figures 4, 5 and 6 are broken sectional elevations of the controlling mechanism and one of the valves, to show the various positions of the cams and the effect thereof upon the valves. In these figures one portion of the structure is offset laterally from the other for the sake of clearness.
Figure 5:
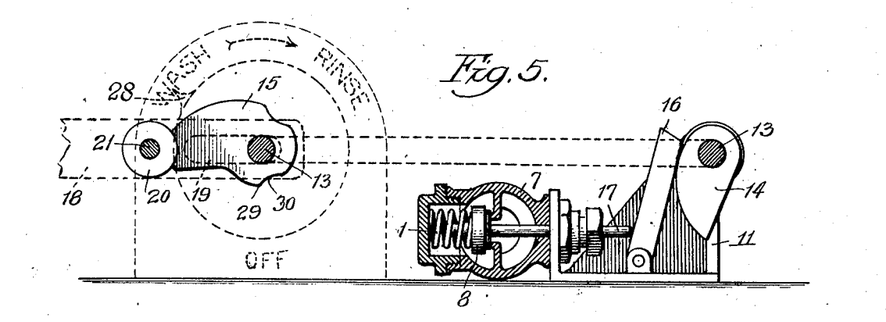
Figure 6:
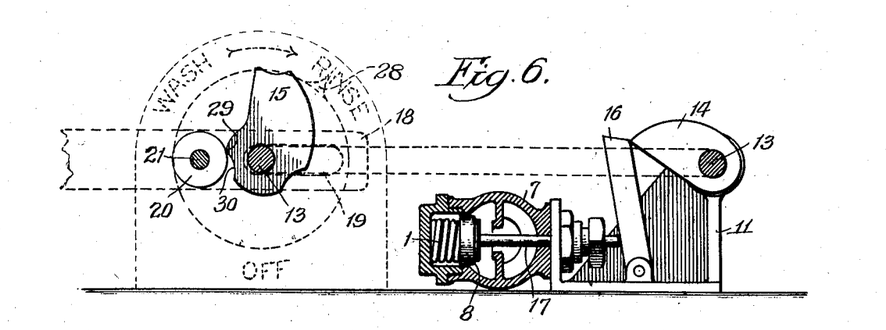

It will be obvious from an inspection of the drawings that when the pointer 28 on handle 27 is turned towards the word "Off" as shown in Fig. 4 both valves 7 and 26 will be closed. When the handle 27 is rotated in a clockwise direction until the pointer points to the word "Wash" cam 15 will force link 18 over to the left turning the crank arm 24 and the operating member 25 in an anti-clockwise direction until valve 26 is held open, permitting the water to flow through the piping 5 and the washing heads 4 thus washing the dishes. In this position which is shown in Fig. 5 cam 14 will not have caused push rod 17 to withdraw closure member 8 in valve 7. It is, therefore, obvious that no water or steam will flow through pipe 6 and the nozzles 10ª, 10ᵇ. The rod 13 and cam 15 will be held in either of the positions shown in Fig. 4 and Fig. 5 by engagement of antifriction member 20 with notches in the edge of cam 15. When the handle 27 is rotated further in a clockwise direction until the pointer points to the word "Rinse," the cam 15 permits the spring 22 to draw the link 18 to the right, turning the crank arm 24 and the operating member 25 in a clockwise direction and closing the valve 26. In this position, which is shown in Fig. 6, the cam 14 displaces the lever 16, opening the valve 7. In order to keep the valve 7 open the operator must hold the handle 27 so as to maintain the parts in the position shown in Fig. 6; for means are provided for preventing the valve 7 from remaining open if the handle is released. Such means consist of a projection 29 on the cam 15. The projection 29 is so placed that when the apex of cam 14 is adjacent the end of lever 16, the point of the projection has passed the line joining the rod 13 and pin 21, so that if the handle 27 is not held by the operator the force of spring 22 will cause roller 20 to force projection 29 to turn cam 15 until the roller 20 seats itself in a notch 30 formed in the cam 15 just behind the projection 29. This turning of the cam 15, and consequently of the shaft 13, is sufficient to move the apex of the cam 14 beyond the end of the lever 16 so that the valve spring will cause member 8 to be seated so as to close valve 7 against the passage of water or steam therethru. This is an automatic means provided to prevent an operator from turning live steam onto the dishes and then going off about something else and leaving the steam flowing on the dishes, which might crack them. Whether hot water or steam is fed through pipes 6 and 9, and nozzles 10ª, 10ᵇ will depend upon which of the valves in the pipes R, S leading into pipe 6 is open.

In the modification shown in Figs. 7 to 10 inclusive, parts 1 to 10, 17, 24 and 25 are the same as in the preceding structure, while parts 11ª, 12ª, 13ª, 14ª, 18ª and 27ª correspond in operation to the similarly numbered parts above described.

Figure 7:
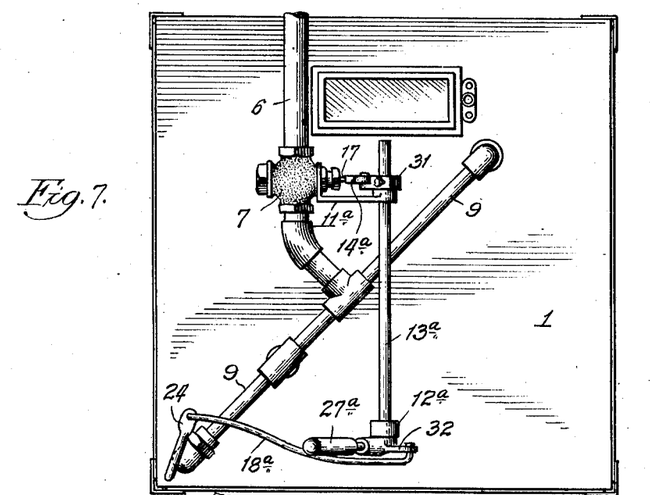
Figs. 7 to 10, inclusive, show a modification of the preceding structure, Fig. 7 being a plan view, Fig. 8, a sectional elevation of parts of the machine going to "wash" position, Fig. 9 a similar view showing the parts in "wash" position and just ready to start to "rinse" position, and Fig. 10 a similar view showing the position of the parts just as they are about to move into "off" position.
Figure 8:
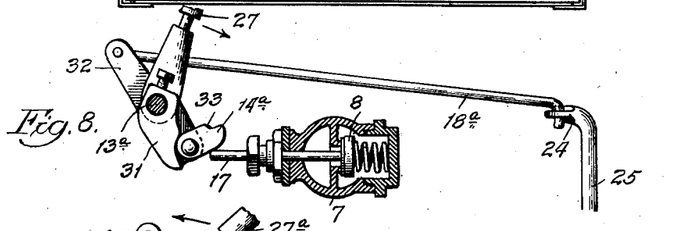
Figures 9, 10:
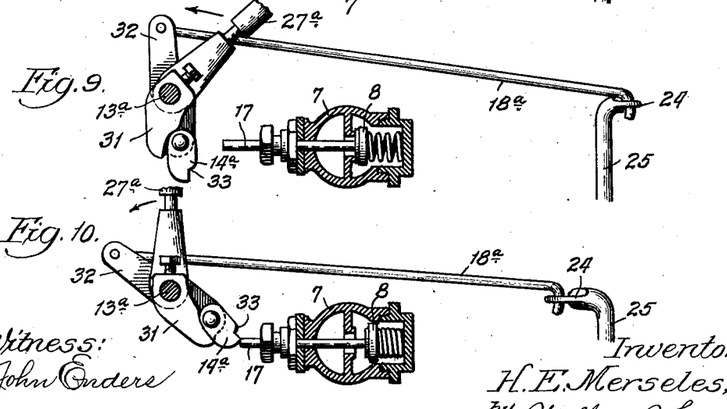

In Fig. 7 the parts are shown in the "off" position, with no washing or rinsing taking place. In this form the rod 13ª is mounted in brackets 11ª and 12ª and is rotated therein by means of a handle 27ª which causes a member 31 carried by the shaft 13ª to carry the cam 14ª about the shaft as shown in Figs. 8, 9 and 10, the direction of movement being indicated by the arrows. As handle 27ª moves to the right as shown in Fig. 8, it causes crank arm 32 to reciprocate link 18ª, thereby rotating shaft 25 about its axis to cause the opening of the wash water valve in the main supply pipe so that washing may take place. As this movement takes place, cam 14ª moves idly over the end of plunger 17 so that valve 8 is not opened. When the parts reach the position shown in Fig. 9, the water is turned on full and washing of the dishes takes place. When the parts start back as indicated by the arrows in Fig. 9 the wash water valve starts to close and is completely closed when cam 14ª strikes the end of plunger 17. Further movement of the handle 27ª causes valve 8 to be opened as shown in Fig. 10, the shoulder 33 on cam 14ª preventing the parts from being moved backwardly to the "wash" position. When the point of the cam 14ª passes the end of plunger 17, the plunger will ride over the rounded face of the cam, forcing the same upwardly, and permitting the valve to close, thereby stopping the rinsing operation. The cycle of operation is now completed and the dishes may be removed from the machine.

Figure 11:
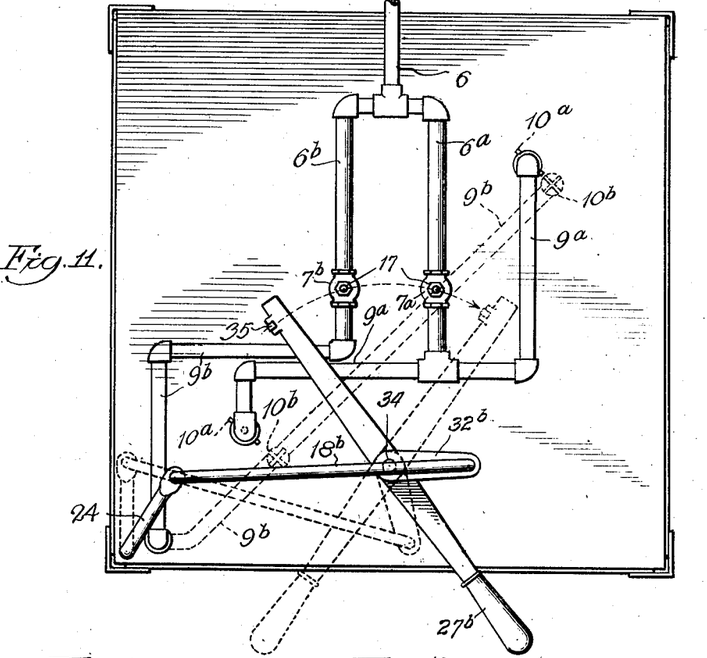
Figure 12:
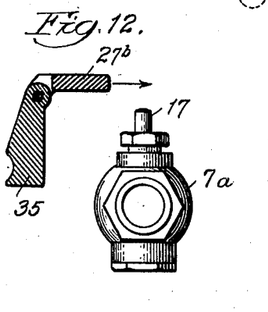
Figure 13:
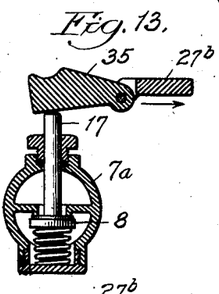
Fig. 13 shows the relation of these parts when the machine is being shifted to the "wash" position, shown in Fig. 14.
Figure 14:
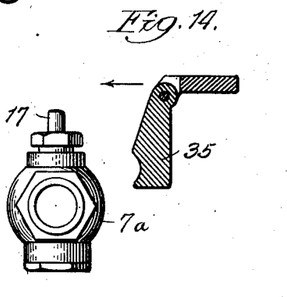

In the form shown in Fig. 11, handle 27ᵇ is pivoted as shown at 34. This handle is extended beyond its pivotal point and carries adjacent the end thereof a pivoted cam member 35. In the position shown in Fig. 11, the parts are in "off" position and must be moved to the dotted line position shown in this figure when it is desired to wash. Fig. 12 shows the position occupied by the cam 35 when the handle is in the full line position shown in Fig. 11. As the handle is swung towards the dotted line position in this figure, the cam 35 slides over the ends of the plungers 17 of the valves 7ª, 7ᵇ as shown in Fig. 13, and, in doing so, does not operate their closure members 8. During the latter part of this movement of the lever 27ᵇ, a link 18ᵇ connecting an arm 32ᵇ fixed to the lever with the crank arm 24 of the operating member 25 turns the operating member in an anti-clockwise direction and opens the valve 26. When the parts reach the "wash" position, the cam 35 will again hang down as shown in Fig. 14. As the arm 27ᵇ starts back to the full line position of Fig. 11, cam 35 comes in contact with plunger 17 of the valve 7ª, and will eventually force the same down so as to open the closure member 8 of this valve as shown in Fig. 15, the end of the plunger resting in a depression in the cam, so that the parts may automatically held themselves in this relation.

Figure 15:
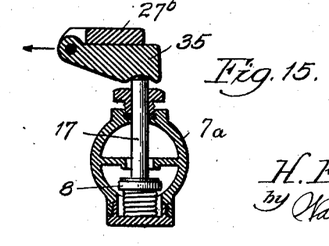
Fig. 15 shows these same parts in the "rinse" position.

By the time the lever 27ᵇ has moved far enough to bring the parts into this position shown in Fig. 15, the lever has, through the arm 32ᵇ, the link 18ᵇ and the crank arm 24, moved the operating member 25 to close the valve 26. Further return movement of the lever releases the stem 17 of the valve 7ª allowing this valve to close, and then causes the cam 35 to open and close the valve 7ᵇ in the same manner.

The pipes 6ª, 6ᵇ shown at the right and left in Fig. 11 lead, respectively, to the upper and lower rinse mechanism, though, of course, the order might be reversed if desired. The pipe 6ª may be connected with the upper rinse nozzles 10ª by piping 9ª and the pipe 6ᵇ with the lower rinse nozzles 10ᵇ by piping 9ᵇ, as shown in Fig. 11. In this figure the lower rinse nozzles are shown slightly out of line with the upper rinse nozzles for the sake of clearness.

Figure 16:
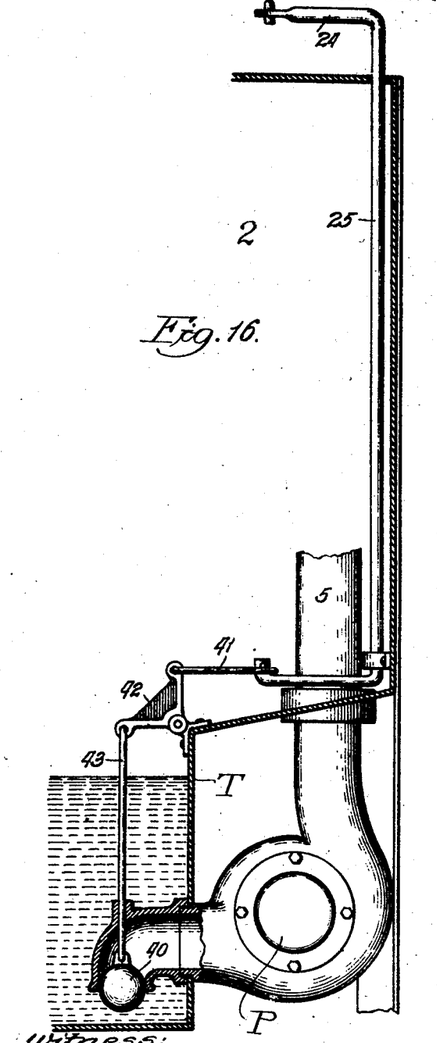
Figs. 16, 17 and 18 show, respectively, ball, flap and gate valves applied to the intake of the pump, and adapted to be used with any of the foregoing types of control.
Figure 17:
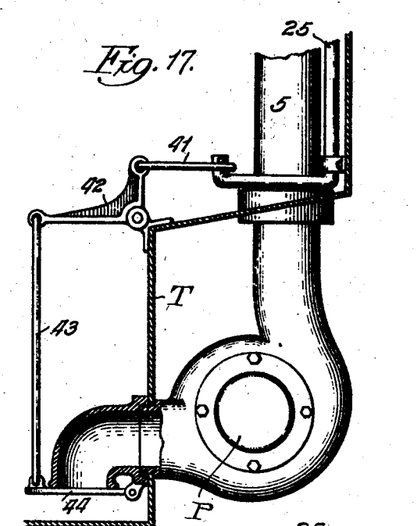
Figure 18:
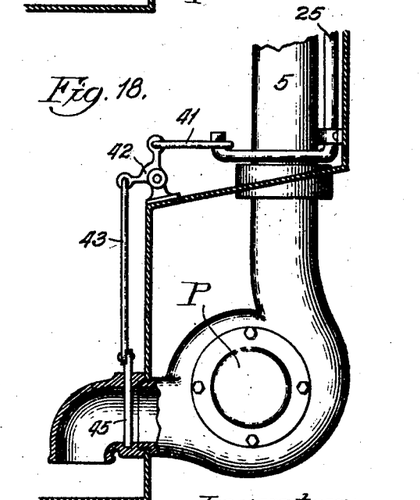

Figs. 16, 17 and 18 show the application of different forms of valves to the intake pipe of the pump instead of to the outlet pipe as shown in Fig. 3. It is evident that the ball valve 40 of Fig. 16 will be operated by the rotation of shaft 25 on its axis, since this will cause reciprocation of the link 41, which will, in turn, cause oscillation of the crank 42 and reciprocation of the link 43. Corresponding parts 41, 42 and 43 will cause actuation of the flap valve 44 shown in Fig. 17 and the gate valve 45 shown in Fig. 18. It is clear that any one of these valves may be used with any one of the forms of construction shown in Figures 1 to 15 inclusive.

It is of course, understood that the specific description of the structure set forth above may be departed from without departing from the spirit of my invention as set forth in this specification, and the appended claims.

Having now described my invention, I claim:

1. In a dish washing machine having a washing and rinsing chamber, the combination of means to support dishes in the chamber, a distributor for directing a washing fluid on dishes on said support, a separate distributor for directing rinsing fluid on the dishes in the same position, separate means for controlling the supply of washing and rinsing fluids to said distributors respectively, and a common operating means for said separate controlling means arranged to operate them seriatim and to prevent the supplying of fluid to both distributors at the same time.

2. In a dish washing machine, a plurality of independent pipes carrying independent nozzles, a valve in each pipe, operating means for each valve comprising a rod carrying a plurality of motion transmitting members and an operating handle, a crank arm connected to one valve, a link permanently connecting the crank arm to one motion transmitting member, and means interposed between the second valve and the second motion transmitting member for causing the operation of said valve by operation of said member.

3. In a mechanism of the character described, in combination, a pair of pipes, a valve in each pipe controlling fluid flow through said pipes, mechanism to control the opening of said valves, including means interconnecting said valves so that they cannot open simultaneously upon operation of the controlling means, said interconnecting means comprising a cam operable in one direction to open one of the valves, and a link adapted to actuate the other valve.

4. In a mechanism of the character described, in combination, a pair of pipes, a valve in each pipe controlling fluid flow through said pipes, mechanism to control the opening of said valves, including means interconnecting said valves so that they cannot open simultaneously upon operation of the controlling means, said interconnecting means comprising a cam operable in one direction to open one of the valves, a link adapted to actuate the other valve, and a lever simultaneously actuating the cam and the link for operation of the valves.

5. In a mechanism for the character described, in combination, a pair of pipes, a valve in each pipe controlling fluid flow through said pipes, mechanism to control the opening of said valves, including means interconnecting said valves so that they cannot open simultaneously upon operation of the controlling means, said interconnecting means comprising a turnable member having two arms, a link connecting one arm and one of the valves, the other arm carrying a cam adapted to actuate the other valve, said cam carrying member preventing rotation of the cam in one direction beyond a certain point but permitting limited free rotation from that point in the opposite direction.

6. In a mechanism of the character described, in combination, a pair of pipes, a valve in each pipe controlling fluid flow through said pipes, mechanism to control the opening of said valves, including means interconnecting said valves so that they cannot open simultaneously upon operation of the controlling means, said interconnecting means comprising a lever, a link connected thereto for operating one of said valves, and a cam connected to said lever and swinging freely in one direction of movement of the lever to pass the valve without operation thereof but being arrested in its movement in the opposite direction so as to cause operation of said valve.

7. In a machine of the character described, a pipe having therein a spring pressed valve closing member having a stem, a lever swinging transversely of said stem, a cam pivotally mounted upon said lever and adapted to swing with the lever past said stem in one direction without operating the valve but adapted when swung in the opposite direction to open the valve.

8. In a dish washing machine having a washing and rinsing chamber, the combination of a support for dishes therein, a distributor for directing a washing fluid against dishes on said support, a separate distributor for directing a rinsing fluid on dishes in the same position, separate means for controlling the supply of washing and rinsing fluids to said distributors respectively, and a common operating means for said separate controlling means arranged to operate the wash controlling means and the rinse controlling means in succession and to prevent the supply of fluid to the rinse distributor before fluid has been supplied to the wash distributor.

9. In a washing machine having a chamber, the combination with means to support dishes, a distributor for directing wash water on dishes on said support and distributors for directing a rinsing medium on dishes on the support, all located in the chamber, of a valve controlling the supply of wash water to the wash distributor, operating means for said valve, two separate valves controlling the supply of rinsing medium to the different rinse distributors, and actuating means for opening and closing said two valves in succession so that they are not both open at the same time.

10. In a washing machine having a chamber, the combination with a support for articles, a distributor for directing wash water on the articles on the support, a plurality of nozzles for directing rinsing fluid on the articles on the support, all located within the chamber, of three valves controlling respectively the supply of wash water to the wash distributor, the supply of rinsing fluid to a part of the rinse nozzles, and a supply of rinsing fluid to the remainder of the rinse nozzles, and controlling means arranged to open and close the three valves in succession so that only one of them is open at any one time.

11. In a washing machine having a chamber and means to support articles to be washed therein, the combination of upwardly directed rinse sprays located below the support, downwardly directed rinse sprays located above the support, means for supplying fluid under pressure to said sprays from a source outside the machine, a normally closed valve controlling the supply of such fluid to approximately one half of the rinse sprays, a second normally closed valve controlling the supply of rinsing fluid to the remainder of the rinse sprays, and a common manually operable control lever for said valves arranged to open either one of them when the other one is closed so that both valves are not open at the same time.

12. In a dish washing machine, the combination of a casing providing a washing and rinsing chamber and containing a wash distributor and a rinse distributor, a reservoir below the casing containing washing fluid and having an opening in one of its side walls near its bottom, a centrifugal pump located outside the reservoir, a conduit connecting said opening in the reservoir with the intake of the pump, a conduit connecting the discharge of the pump with the wash distributor, means independent of the pump for supplying a rinsing fluid to the rinse distributor, and a valve located in the reservoir below the fluid level therein for cutting off the flow of fluid to the pump.

In witness whereof, I hereunto subscribe my name to this specification.

HERBERT E. MERSELES.